United States Patent [19]
Rack

[11] 3,961,445
[45] June 8, 1976

[54] PLANT HOLDER AND PROCESS FOR PRODUCING THE SAME

[75] Inventor: David Rack, Freilassing, Germany

[73] Assignee: Plana-GmbH, Luxembourg, Luxemburg

[22] Filed: Feb. 12, 1974

[21] Appl. No.: 442,115

[30] Foreign Application Priority Data
Feb. 16, 1973  Germany ............... 2307732

[52] U.S. Cl. ............... 47/37; 47/34.13; 264/321; 260/2.5 A
[51] Int. Cl.² ............... A01G 9/02
[58] Field of Search ............... 47/34, 34.13, 37, 56, 47/DIG. 7; 71/64 A, 64 G, 64 R, 24; 264/321

[56] References Cited
UNITED STATES PATENTS

| | | | |
|---|---|---|---|
| 3,513,593 | 5/1970 | Beck | 47/34.13 |
| 3,664,062 | 5/1972 | Danielson | 47/34.13 |
| 3,799,755 | 3/1974 | Rack | 47/37 UX |
| 3,834,072 | 9/1974 | Rack | 47/56 UX |
| 3,835,584 | 9/1974 | Shimazu | 47/37 |

FOREIGN PATENTS OR APPLICATIONS

| | | | |
|---|---|---|---|
| 888,854 | 12/1943 | France | 47/34.13 |
| 1,146,302 | 3/1963 | Germany | 47/37 |
| 1,296,746 | 11/1972 | United Kingdom | 47/37 |

*Primary Examiner*—Robert E. Bagwill
*Attorney, Agent, or Firm*—Max Fogiel

[57] ABSTRACT

A plant holder arrangement in which an elastic binding material interconnects a substrate mixture of peat, humus, loam, as well as organic and/or mineral fertilizers. The substrate consists of a mixture of 30 – 70 percent by volume of polyurethane foam flakes with a particle size of 3 – 15 mm.

10 Claims, 6 Drawing Figures

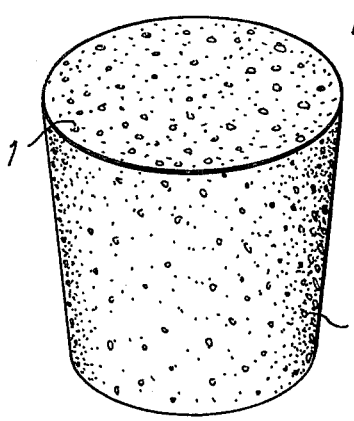
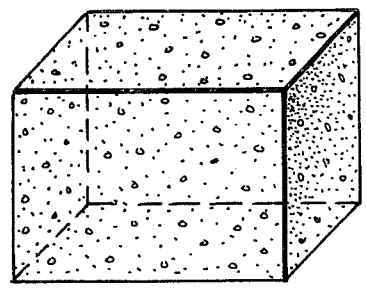
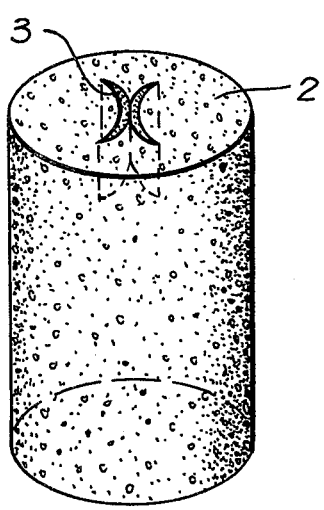
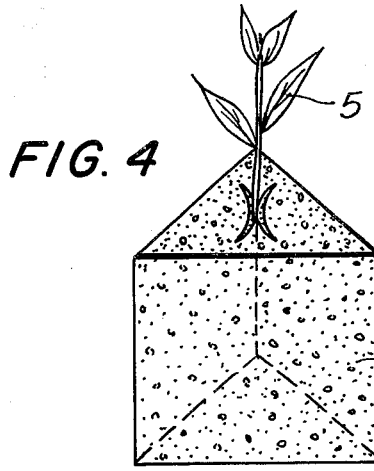
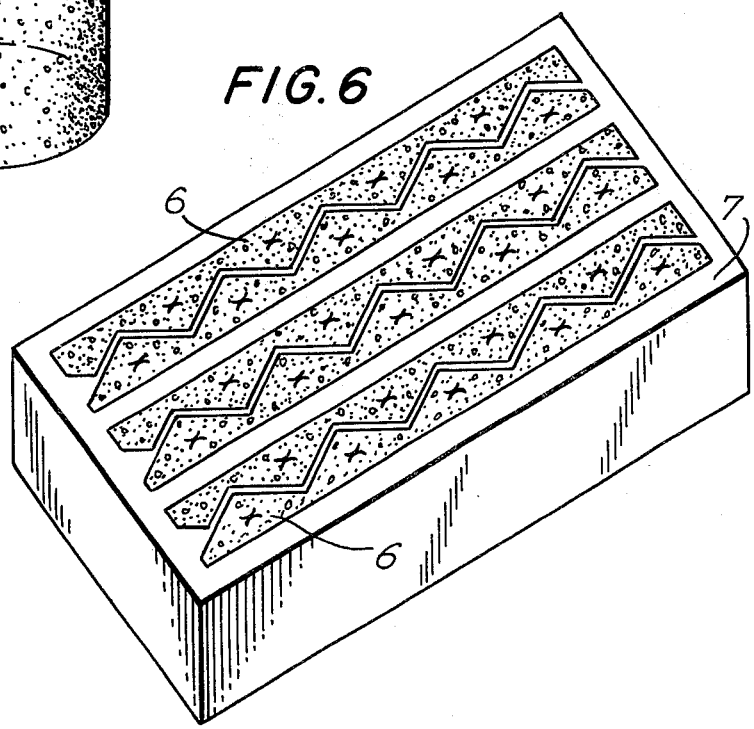

PLANT HOLDER AND PROCESS FOR PRODUCING THE SAME

BACKGROUND OF THE INVENTION

It is known in the art that plants can be grown from seeds or seedlings or layers of these, which are contained in plant holders, that are inserted together with the plants in their final locations in the ground, e.g. in open areas. It is important that the plant holder have a certain ruggedness and compactness, so that it does not fall apart in transport and handling. On the other hand, with excessive compression of the substrate consisting of peat, humus, and nutrients, a plant holder with such great density is obtained that the plants cannot develop properly. A process for the construction of plant holders is disclosed in Austrian Pat. No. 294,484, in which a substrate mixture of peat, humus, and nutrients is precompressed into a plant holder. The holder is inserted into a form so that there is a space between the holder and the wall of the form, in which a soft, elastic plastic foam material, e.g. polyurethane foam, is produced. The polyurethane foam encloses and holds together the plant holder in the manner of a pot after removal from the form. Furthermore, from Swiss Pat. No. 514,980, as well as from German Pat. No. 2,025,316, a process is known, in which the liquid foam components are added as a binding agent to the mixture of peat, humus, loam, or clay and nutrients.

The resulting mixture is inserted in a form, where the binding agent is allowed to set. Here, too, polyurethane components that foam up in the presence of water have proven themselves as appropriate binding agents, where polyether-based components are used as the polyol components, and the toluoldiisocyanates, known from the manufacture of polyurethanes, are used as the isocyanate components. The direct use of synthetic foam materials as a substrate for a soilless plant culture is also well known in the art. Thus, German Pat. No. 1,018,077 discloses a synthetic-plastic foam, consisting of aminoplastic, phenoplastic, and melamine plastic, used as the culture medium for soilless plant growth. Furthermore, in German Pat. No. 1,221,484 a process for the construction of plant holders is disclosed, in which particles of an elastic plastic, e.g. polystyrol, are mixed with inorganic, inelastic materials, such as pumice, by means of a binding agent, such as rubber latex. To this mixture of particles, such additional organic substances as coffee grounds, etc., or replacements loaded with fertilizing salts may be added to the binding agents prior to permitting setting to take place. Soft polyurethane foams themselves have also become known for soilless plant cultivation. Thus, German Pat. No. 2,063,715 discloses the use of a dark foam material obtained through the addition of soot or an equivalent blackcoloring material. This material can then be used in the form of cubes or similar shapes as a plant holder, which stores solar heat particularly well. The soft polyurethane foam materials in general are open-celled, which enables them to accept water, making them suitable as material for plant holders. However, with use of a polyurethane foam block that is too soft, the roots of the plant, as soon as they have reached a certain height, are no longer held sufficiently strongly in the plant bed, so that the plant can easily sway. This is particularly disadvantageous in outdoor planting, because then the most delicate roots at the periphery of the root bundle, which have developed and extended into the foam material, can tear out or off while the plant sways in a wind or a storm. Therefore, it is essential that the foam have a greater ruggedness and rigidity. But the consequence of this is that when the roots grow into the pores of the foam, the latter offers a pronounced permanently-elastic resistance, which can inhibit the growth of the roots.

Now, it has been determined that a substrate consisting of 30 — 70 percent by volume of very finely pulverized polyurethane foam flakes with a flake or particle size of 3 – 15 m, preferably 5 – 8 mm, and 70 – 30 percent by volume of peat, humus, or loam and fertilizers if required. The particles of these are held together by an elastic binding agent, having particularly favorable properties for plant holders. For the mixture, according to the invention, a polyurethane foam, which has been made recticular by chemical or physical processing, as described in German Pat. No. 1,036,510, or German Pat. Nos. 1,159,164 and 1,179,362, is particularly appropriate. Through this processing, a particularly loose, grid-like structure of the foam is obtained, which, in combination with peat and the other substrate particles, gives the plant holder a particularly loose and yet rugged structure with good water-retaining properties for the purposes of the invention. Particularly advantageous, here, is the use of a soft polyurethane foam, which, by means of physical processing, has been changed into the desired grid-like structure for the purpose of breaking open the cell walls, as is described in detail in German Pat. No. 1,504,096 which corresponds to U.S. Pat. Nos. 3,175,030 3,175,025; and 3,329,759. In processing the foam materials, the pores that are still partially closed are opened, and at the same time the thickness of the foam skeleton is reduced. The foam thus obtained, with a reticular structure, lends the substrate material a particularly high capillary capability for air and water.

SUMMARY OF THE INVENTION

In the plant holder according to the invention, a portion of the polyurethane foam can also be replaced by an open-pored rubber latex foam, particularly natural latex foam. By means of the combination of these two types of foam, a good possibility of fine-tuning the water-retaining capability of the plant holder is obtained. This is because the latex foam yields water more easily than the polyurethane foam. Thus the volume of the air pores of the plant holder can be favorably controlled during plant growth, so that even with intensive watering a suffocation of the thinnest fiber roots is prevented.

As fertilizers all mineral or organic materials are suitable, and are slowly yielded from the substrate material to the plant. An appropriate mixture contains dried blood, horn meal, urea, as well as mineral fertilizers with trace elements. As suitable binding agents, solutions or dispersions of synthetic or natural rubber may be used. Here care must be taken that, in particular when using rubber latex, no materials that inhibit plant growth are employed. Gelatine solutions or other solutions of albumens can also serve as binding agents. But for the plant holder material, according to the invention, the polyurethane material has been found particularly advantageous, that is formed in situ by use of a combination of polyol and polyisocyanate, which connects the substrate particles particularly ruggedly and yet elastically. Here care has to be taken that the mixture of particles of foam flakes, peat, humus, loam, fertilizers, etc., does not contain any water capable of reacting, since this would otherwise unnecessarily react with the components of the polyurethane or the isocyanate compound, causing decomposition and development of carbon dioxide.

In the plant holder according to the invention, the use of polyester urethane foam is particularly advantageous. This is true because the latter, in contrast to the polyether foam, is decomposable by soil bacteria, so that the foam flake portion as well as the peat gradually decay, and the new plant holder, after planting outdoors, can serve completely as nutrient for the plant. Thus the plant holder obtained in this manner is ecologically sound, leaving no remains.

It is recommended that for the diverse applications of the plant holder polyester foams with different decomposition rates be used. Those containing many ester groups decompose rapidly and are particularly appropriate for plant holders to be used in vegetable cultivation and for raising decorative plants. Polyester foams that do not decompose so easily, and which consist of higher-molecule dicarbon acids and higher polyalcohols as polyester components, therefore do not decay as quickly, and are appropriate for tree nurseries. In this connection, it is important that the polyester polyurethane foams be constructed, if possible, without the addition of silicones, i.e., silicon-oxygen polymers, since these polysilicon-oxygen components degrade the decomposability of the polyurethane foam. The type of isocyanate components used is less important for the decomposition of the polyurethane foam. A chemically-processed, reticulated polyester foam, e.g., one treated with a sodium lye or sulfuric acid, will decompose particularly rapidly because of the hydrolitic decomposition that has already taken place during processing. The plant holders according to the invention can be preferably constructed in the following manner:

The fine-pored soft polyurethane foam in larger or smaller pieces, for which scrap foam pieces may well be used, is mixed with part or all of the dried turf and broken up into small pieces in a rupturing or pulverizing drum until the desired average flake size is obtained. In this type of pulverization, the peat is partially worked into the pores of the soft foam, which gives the foam particles a greater ruggedness, without degrading its air or water retaining capability. Subsequently, if necessary, further quantities of peat, as well as humus, i.e. compost, and the mineral or organic fertilizer are added. Here a disinfectant containing no halogens is used to make the substrate material germ-free. Then the liquid binding agent is added, which consists of liquid rubber or a latex of synthetic rubber, or a solution of A synthetic rubber in a slightly evaporating organic solute, or a watery gelatin solution, but preferably consisting of the components for making a polyurethane foam. Then the mixture is inserted into forms, and slightly compressed if necessary, where it sets to a plant holder of the desired density. After setting, the material is removed from the form, and can, as required, be cut into the desired size and used directly for growing the plants. Preferably a polyether is used for the polyol component of the polyurethane binding agent, since this material can be more easily worked in as a binding agent component than the polyester component.

The peat should be intensively dried, i.e., it should contain at most 6 percent water. With normally dried peat there is always disposable water present, which can react in an undesirable manner with the binding agent component, i.e., the diisocyanate component. But, because of the intensive drying of the peat, this becomes practically water-repellent. Thus, to enable the finished plant holder to absorb water easily, the substrate mixture should also contain one or more halogen-free wetting agents. This wetting agent may also be added to the peat before combining. The anionic materials with active surfaces are particularly suitable as wetting agents. The invert soaps, besides aiding wetting, also have the advantage of having disinfecting, i.e., antibacterial properties, so that an undesired micro-biological growth in the plant holder is suppressed or prevented.

The new type of plant holders, through the combination of finely pulverized polyurethane foam flakes with peat and humus and the setting of the substrate particles by means of an elastic binding agent, have many advantages that were not previously realizable with the known plant holders. The plant holder exhibits an inner and outer ruggedness without offering any resistance to root development, allows good air and water retaining capability, and is gradually entirely decomposable when polyester foam is used. Therefore, and because of its content of peat, humus, and fertilizers, it allows plants to grow better than a plant holder consisting of polyurethane foam. In contrast to the previously known plant holders, in which, for example, the substrate was bound to the peat and humus by polyurethane components, the presence of flakes of preferably physically or chemically treated polyurethane foam in the combination, according to the invention, gives a particularly good aeration with an enlarged water retaining capability. Plant holders, as known in the art are not only employed for the growing of plants from seeds, but also frequently for the development of plants from seedlings or from seed layers.

In order to enable easy insertion of the seeds or seedlings, conventional plant holders are equipped with cavities or slots. Surprisingly, for seedlings, the provision of two abutting concave slots to a depth of 2 – 3 cm on the upper surface of the plant holder has proven particularly successful. These two cuts in the form of a sickle give the form of the Greek letter $\chi$ or a double-sickle. At the point where the two concave sickle arcs touch, the seedling can easily be inserted into the elastic plant holder material. Due to the particular nature of the slot according to the invention, the seedling is kept in an upright position without danger of falling over, as is the case with a simple and straight slot known in the art. For this realization of the insertion slot, according to the invention, the composition of the plant holder material is inconsequential. Therefore it can also be used with conventional plant holders made, for example, of a piece of foam.

Because of the particular outer stability of the plant holder, according to the invention, there result, despite its loose inner structure, many possibilities of construction according to the application, as is shown in further detail in the examples described below.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a perspective view of a plant holder in the form of a flower pot, in accordance with the present invention;

FIG. 2 is a perspective view of a plant holder in the form of a cube;

FIG. 3 is a plan view of a cylindrical plant holder;

FIG. 4 is a perspective view of a plant holder in the form of a prism;

FIG. 5 is a plan view of prism plant holder sof FIG. 4 when connected together to form a plant holder strip with sawtooth profile; and FIG. 6 is a plan view of several plant holder strips arranged on a plate, in accordance with the present invention.

DESCRIPTION OF THE PREFERRED EMBODIMENTS

EXAMPLE 1

30 kg polyester urethane foam, reticulated by processing according to the German Pat. No. 1,504,096, was pulverized in a rupturing or pulverizing drum under addition of 20 kg finepored natural latex foam scraps, in the presence of 20 kg peat, which had been dried to a water content below 6 percent, down to a flake size of 5 – 8 mm. In a mixing drum, the pulverized foam flakes were mixed with a further 20 kg of peat, 5 kg compost, and 5 kg. of kg Thereafter, this mixture was moistened by spraying for 10 minutes with a liquid mixture of 13 kg polyether polyol, 7 kg diisocyanate, 50 g zinc activator, 250 g invert soap as wetting and disinfecting agent, as well as 250 g of an anionic wetting agent, which had been prepared shortly before application. The material obtained in this manner was filled into a square pressing form with two sides of 1 m and a height of 2 m, and was compressed by a stamper down to 1 cubic meter. After 6 hours under the stamper, the reaction was completed, and the bound substrate cube could be removed from the form, and could be cut with knives down to the required size and shape. FIGS. 1 and 2 show bound plant holders, according to the invention.

EXAMPLE 2

As given in example 1, 40kg polyester urethane foam, 10 kg of natural latex foam, in the presence of 40 kg of dried peat, which had previously been mixed with 250 g of an anionic wetting agent, was pulverized in a pulverizing drum. To this foam flake-peat mixture were added 10 kg of compost, and 3 kg fertilizer. Then a previously prepared liquid mixture of 10 kg polyether polyol, 5 kg diisocyanate, 50 g zinc activator, and 250 g invert soap were sprayed into the material. The substrate mixture thus obtained was compressed down to a volume of 1.2 cubic meters in a stamper as described in example 1. After the setting of the binding agent, the block was removed from the form and was cut into cubes 5 cm on a side. The individual plant holders then received double-sickle slots on the upper surface to a depth of 2 cm, as shown in FIG. 3 for a round plant holder.

The gardener can then insert seedlings, e.g., pelargonium seedlings or holders of etc., at the point of contact or crossing of the double-sickle slot according to the invention, with assurance of proper seating. FIG. 4 shows such a seedling inserted in the double-sickle slot, where it is guarded against falling over by the particular form of the slot, and therefore rapidly forms roots.

EXAMPLE 3

The mixture obtained according to example 1, after completing the reaction under slight pressure, was removed from the form, and the resulting 1-cubic-meter cube was first cut into plates with sides of 1 m and a thickness of 3.5 cm. Thereafter each plate was cut into strips with a saw-tooth profile on one side, where the thickness at the point of the saw-tooth was 4 cm and at the trough was 0.8 cm. FIG. 5 shows such a strip.

By separating or tearing of the individual "teeth" of the saw-tooth-profile strip, single, small plant holders of triangular or prismatic form were obtained.

To enable the sure insertion of the seedling, with this form of plant holder, it is possible to provide the double-sickle slot according to the invention on the upper side of the strip with saw-tooth profile in the middle of the tooth. With this special form of construction of the plant holder, in which the individual plant holders are still connected with one another according to the invention, there result considerable advantages for the mass cultivation of seedlings. The individual strips can be placed in pairs with meshing teeth with only a small separation of, for example 2 – 5 mm and provided with seedlings. Then the plant holders are watered, and the seedlings can be made to develop roots in the greenhouse. If required, after development of the roots, the strip can be separated only during the planting of the seedlings. This can be carried out, for example, automatically. In this manner, the handling and planting of seedlings together with their plant holders in large quantities can be simplified and automated. In the drawing, FIG. 1 shows a plant holder according to the invention, which has the form of a flower pot. The soft polyurethane foam flakes 1 present, according to the invention, are evenly distributed in the substrate material and are bound to the other components by the binding agent. FIG. 2 shows a plant holder according to the invention in the form of a cube. FIG. 3 shows a view of a cylindrical plant holder with the two concave sickle-formed slots 2,3, which touch in the center of the slots, forming the double-sickle insertion slot. FIG. 4 shows a plant holder 4 in the form of a prism, with the insertion slot according to the invention and an inserted seedling 4. FIG. 5 shows a view of prism-form plant holders 4 according to FIG. 4, but still connected with each other to form a plant holder strip 6 with sawtooth profile. The individual plant holder can, if desired, be easily separated from each other. FIG. 6 shows several plant holder strips 6 arranged on a plate or ganged, as can be provided for the development of roots en masse on seedlings, e.g., carnation or geranium seedlings. The strips are arranged in pairs. The space between the strips can be kept relatively small, so that a good utilization of space results, without the possibility that the developing roots of one seedling can grow into the neighboring plant holder. This is undesirable, because then some of the developed roots would have to be torn in order to separate the seedlings. This danger would be present with a plant holder strip, in which a row of e.g., plant holders in the form of a cube were united in a strip. Because of the saw-tooth profile and the resulting prism-form of the plant holders, this is not the case, despite the fact that these are still united in a strip, and therefore can be better handled in the mass cultivation of seedlings than a large number of individual plant holders.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

I claim:

1. A plant holder comprising a substrate mixture of peat, humus, loam, and fertilizer, with reticulated flakes of polyurethane foam carrying said substrate mixture, said mixture and flakes being bound together by an elastic binder, said binder being present in an amount sufficient to produce a coherent yet porous mass.

2. The plant holder as defined in claim 1 wherein said polyurethane foam comprises a polyesterurethane foam.

3. The plant holder as defined in claim 1 including strip means interconnecting a plurality of plant holders, said plant holders being prism-shaped with a saw-tooth cross-section.

4. The plant holder as defined in claim 3 wherein said strip means comprises pairs of strips with the saw-tooth surfaces facing and meshing with each other, the cross-section of a combined meshed pair of strips being substantially rectangular-shaped.

5. A plant holder as defined in claim 1 including two concave slots contacting each other to form an insertion slot.

6. The plant holder as defined in claim 5 wherein said concave slots are sickle shaped slots for forming a doublesickle shaped insertion slot, said slots contacting each other.

7. The plant holder as defined in claim 6 wherein said plant holder has a substantially triangular-shaped cross-section.

8. The plant holder as defined in claim 6 wherein said plant holder has a substantially circular-shaped cross-section.

9. The plant holder as defined in claim 6 wherein the shape of said plant holder is substantially the frustum of a cone.

10. The plant holder as defined in claim 1 including strip means interconnecting a plurality of plant holders, said plant holders being prism-shaped with a saw-tooth cross-section, said strip means comprising pairs of strips with the saw-tooth surfaces facing and meshing with each other, the cross-section of a combined meshed pair of strips being substantially rectangular-shaped, two concave slots contacting each other to form an insertion slot, said concave slots being sickle shaped slots for forming a double-sickle shaped insertion slot, said slots contacting each other, said fertilizer means comprising organic and mineral fertilizers, said polyurethane foam comprising a polyesterurethane foam; said double sickle slot being formed of two crescent-shaped slots substantially tangentially in contact with each other.

* * * * *